US011683845B2

(12) United States Patent
Fujishiro et al.

(10) Patent No.: US 11,683,845 B2
(45) Date of Patent: Jun. 20, 2023

(54) COMMUNICATION CONTROL METHOD, RADIO TERMINAL, APPARATUS AND BASE STATION

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/736,337

(22) Filed: May 4, 2022

(65) Prior Publication Data

US 2022/0264655 A1    Aug. 18, 2022

Related U.S. Application Data

(63) Continuation of application No. 17/091,381, filed on Nov. 6, 2020, now Pat. No. 11,350,465, which is a
(Continued)

(51) Int. Cl.
*H04W 74/08* (2009.01)
*H04W 72/04* (2023.01)
*H04W 76/27* (2018.01)

(52) U.S. Cl.
CPC ....... *H04W 74/0833* (2013.01); *H04W 72/04* (2013.01); *H04W 76/27* (2018.02)

(58) Field of Classification Search
CPC ..... H04W 76/27; H04W 76/25; H04W 76/34; H04W 76/36
See application file for complete search history.

(56) References Cited

U.S. PATENT DOCUMENTS 9,215,731 B2    12/2015  Kitazoe et al.
11,533,742 B2*  12/2022  Tsai ................. H04W 74/0841
(Continued)

FOREIGN PATENT DOCUMENTS

EP    3737201 A1    11/2020
JP    2011-508538 A   3/2011
(Continued)

OTHER PUBLICATIONS

Ericsson; "Details on PRACH Partitioning for EDT"; 3GPP TSG RAN WG2 #101; R2-1803078; Feb. 26-Mar. 2, 2018; pp. 1-11; Athens, Greece.
Huawei; "Report of the Email Discussion [101#57][NB-IoT/MTC R15] EDT Remaining Issues"; 3GPP TSG-RAN WG2 Meeting #101 bis; R2-1805078; Apr. 16-20, 2018; pp. 1-25; Sanya, China.
Huawei et al.; "Early DL Data Transmission"; 3GPP TSG RAN WG2 Meeting #101; R2-1802222; Feb. 26-Mar. 2, 2018; pp. 1-6; Athens, Greece.
(Continued)

*Primary Examiner* — Kevin Kim
(74) *Attorney, Agent, or Firm* — Studebaker & Brackett PC

(57) ABSTRACT

A communication control method used in a user equipment, a user equipment, an apparatus for controlling a user equipment, and a base station that communicates with user equipment. The user equipment performs a predetermined data transmission in which it transmits uplink user data in an RRC idle state. When the user equipment is in an RRC connected state, it transmits an RRC message to a base station indicating that the user equipment is interested to perform the predetermined data transmission after transitioning to RRC idle mode. The base station receives, from user equipment when the user equipment is in an RRC connected state, the RRC message indicating that the user equipment is interested to perform the predetermined data transmission after transitioning to RRC idle mode.

6 Claims, 7 Drawing Sheets

Related U.S. Application Data continuation of application No. PCT/JP2019/018522, filed on May 9, 2019.

(60) Provisional application No. 62/668,889, filed on May 9, 2018.

(56) References Cited

U.S. PATENT DOCUMENTS

| | | | |
|---|---|---|---|
| 2012/0294146 | A1 | 11/2012 | Wu |
| 2016/0014815 | A1 | 1/2016 | Vajapeyam et al. |
| 2016/0374048 | A1 | 12/2016 | Griot et al. |
| 2017/0099660 | A1 | 4/2017 | Oh |
| 2018/0324854 | A1 | 11/2018 | Phuyal et al. |
| 2020/0068547 | A1 | 2/2020 | Li et al. |
| 2020/0322923 | A1* | 10/2020 | Yasukawa ............... H04W 4/44 |
| 2020/0374966 | A1 | 11/2020 | Chang et al. |
| 2021/0136826 | A1 | 5/2021 | Chang et al. |

FOREIGN PATENT DOCUMENTS

| | | |
|---|---|---|
| JP | 2013-528985 A | 7/2013 |
| WO | 2016/204985 A1 | 12/2016 |

OTHER PUBLICATIONS

LG Electronics; "Data Transmission During Random Access Procedure in NB-IoT"; 3GPP TSG RAN WG1 Meeting #92bis; R1-1804522; Apr. 16-20, 2018; pp. 1-9; Sanya, China.

Intel Corporation; "[101#58][NB-IoT/MTC R15] EDT Security Issues"; 3GPP TSG RAN WG2 Meeting #101bis R2-1804899; Apr. 16-20, 2018; pp. 1-34; Sanya, China.

Ericsson; "Remaining Issues in Early Data Transmission over NAS"; 3GPP TSG-RAN WG2 #100; R2-1713056; 8 pages; Nov. 27-Dec. 1, 2017; Reno, Nevada, USA.

Qualcomm Incorporated, "Early data transmission", 3GPP TSG-RAN WG1 Meeting #89, R1-1708800, May 15-19, 2017, total 10 pages, Hangzhou, China.

Interdigital Inc.; "RACH Configuration for NR"; 3GPP TSG-RAN WG2#NR AdHoc#2; R2-1706685; Jun. 27-29, 2017; pp. 1-3; Qingdao, China.

Huawei et al.; "Security issues for EDT in the UP solution for eMTC and NB-IoT"; 3GPP TSG-RAN WG2 Meeting #101; R2-1802218; Feb. 26-Mar. 2, 2018; pp. 1-6; Athens, Greece.

* cited by examiner

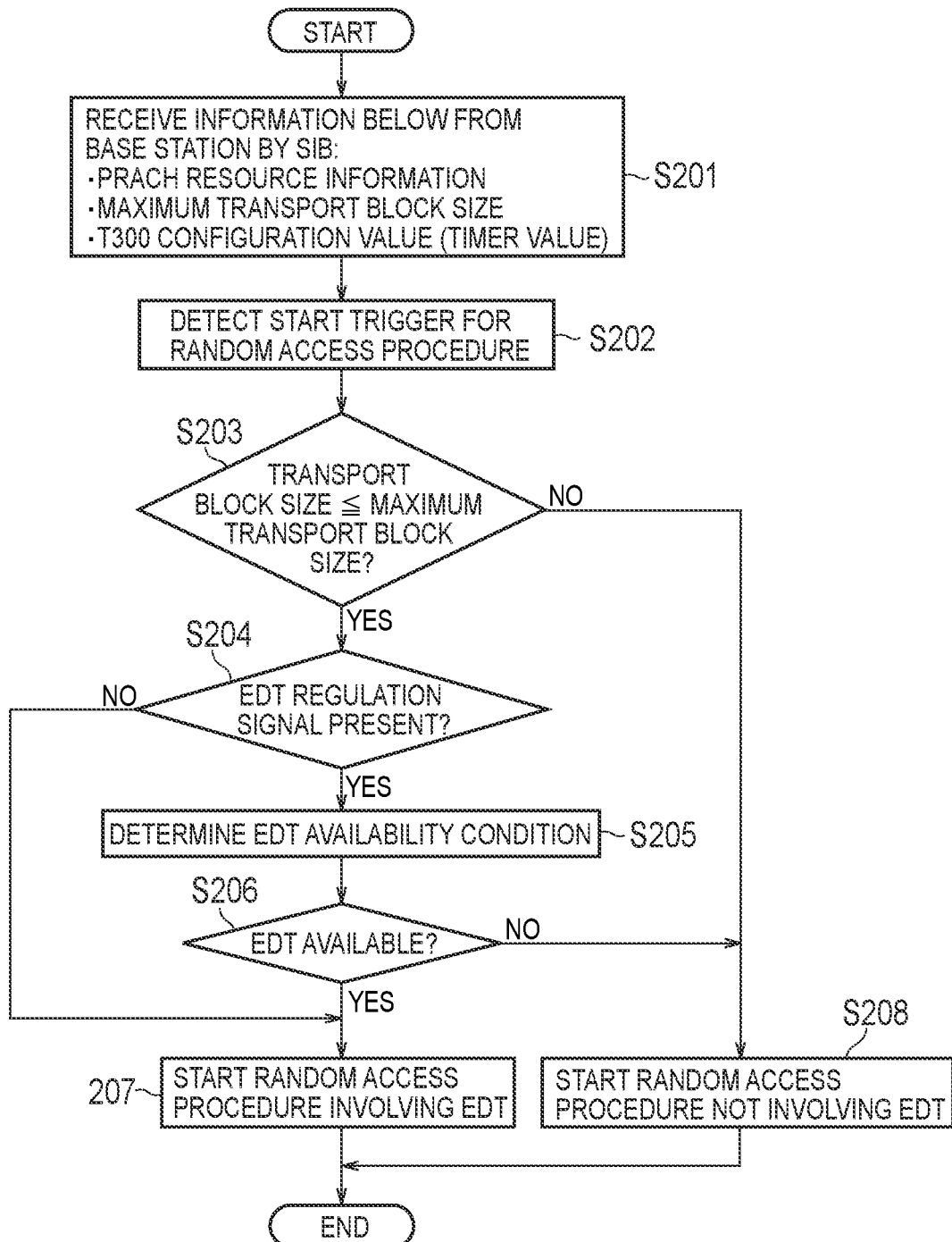

COMMUNICATION CONTROL METHOD, RADIO TERMINAL, APPARATUS AND BASE STATION

RELATED APPLICATIONS

This application is a Continuation application of U.S. patent application Ser. No. 17/091,381, filed Nov. 6, 2020, which is a Continuation application of International Application No. PCT/JP2019/018522, filed May 9, 2019, which claims the benefit of U.S. Provisional Application No. 62/668,889, filed May 9, 2018, the entire contents of which are incorporated herein by reference.

TECHNICAL FIELD

The present disclosure relates to a communication control method, a radio terminal, an apparatus for controlling a user equipment, and a base station of a mobile communications system.

BACKGROUND ART

In recent years, radio terminals directed toward machine type communication (MTC) and internet of things (IoT) services in which communication is performed without human intervention have become popularized. Such radio terminals require the implementation of low costs, expanded coverage, and low power consumption. Hence, according to 3rd generation partnership project (3GPP), new radio terminal categories for which transmission/reception bandwidths are restricted only in a portion of the system transmission/reception frequency bands have been specified.

A radio terminal directed toward MTC or IoT has a small data volume for transmission and reception and transmits and receives data infrequently in comparison with a general radio terminal. Accordingly, to enable a radio terminal directed toward MTC or IoT to perform communications efficiently, early data transmission, in which user data is transmitted using a predetermined message during a random access procedure, has been investigated.

However, current mobile communications systems are not expected to transmit user data during a random access procedure, and a mechanism enabling early data transmission does not exist.

SUMMARY

A communication control method according to the present disclosure is used in a user equipment for performing a predetermined data transmission in which the user equipment transmits uplink user data in an RRC idle state, the communication. The control method comprises transmitting an RRC message to a base station when the user equipment is in an RRC connected state. The RRC message indicates that the user equipment is interested to perform the predetermined data transmission after transitioning to RRC idle mode.

A user equipment according to the present disclosure performs a predetermined data transmission in which the user equipment transmits uplink user data in an RRC idle state. The user equipment comprising a processor and a memory. The processor is configured to transmit an RRC message to a base station when the user equipment is in an RRC connected state. The RRC message indicates that the user equipment is interested to perform the predetermined data transmission after transitioning to RRC idle mode.

An apparatus for controlling a user equipment according to the present disclosure performs a predetermined data transmission in which the user equipment transmits uplink user data in an RRC idle state. The apparatus comprises a processor and a memory. The processor is configured to transmit an RRC message to a base station when the user equipment is in an RRC connected state. The RRC message indicates that the user equipment is interested to perform the predetermined data transmission after transitioning to RRC idle mode.

A base station according to the present disclosure communicates with a user equipment that performs a predetermined data transmission in which the user equipment transmits uplink user data in an RRC idle state. The base station comprises a processor and a memory. The processor is configured to receive an RRC message from the user equipment when the user equipment is in an RRC connected state. The RRC message indicates that the user equipment is interested to perform the predetermined data transmission after transitioning to RRC idle mode.

A control method according to one embodiment is for controlling early data transmission configured to perform user data transmission during a random access procedure. The control method comprises: transmitting, by the user equipment to a base station during the random access procedure, a random access preamble configured for the early data transmission; and transmitting, by the user equipment to the base station during the random access procedure, a MSG 3 message including uplink user data. The MSG 3 message further includes a Medium Access Control (MAC) Control Element (CE) indicating that no downlink user data transmission is expected.

A user equipment according to one embodiment is configured to perform early data transmission in which user data is transmitted during a random access procedure. The user equipment comprises: a processor and a memory, the processor is configured to transmit to a base station during the random access procedure, a random access preamble configured for the early data transmission, and transmit to the base station during the random access procedure, a MSG 3 message including uplink user data. The MSG 3 message further includes a Medium Access Control (MAC) Control Element (CE) indicating that no downlink user data transmission is expected.

An apparatus according to one embodiment is for controlling a user equipment configured to perform early data transmission in which user data is transmitted during a random access procedure. The apparatus comprises: a processor and a memory, the processor is configured to transmit to a base station during the random access procedure, a random access preamble configured for the early data transmission, and transmit to the base station during the random access procedure, a MSG 3 message including uplink user data. The MSG 3 message further includes a Medium Access Control (MAC) Control Element (CE) indicating that no downlink user data transmission is expected.

A base station according to one embodiment is configured to communicate with a user equipment configured to perform early data transmission in which user data is transmitted during a random access procedure. The base station comprises: a processor and a memory, the processor is configured to receive from the user equipment during the random access procedure, a random access preamble configured for the early data transmission, and receive from the user equipment during the random access procedure, a MSG 3 message including uplink user data. The MSG 3 message further includes a Medium Access Control (MAC) Control Element (CE) indicating that no downlink user data transmission is expected.

BRIEF DESCRIPTION OF DRAWINGS

FIG. 9 is a diagram illustrating an example of UE operations according to a second embodiment.

DESCRIPTION OF EMBODIMENTS

Figure 1:
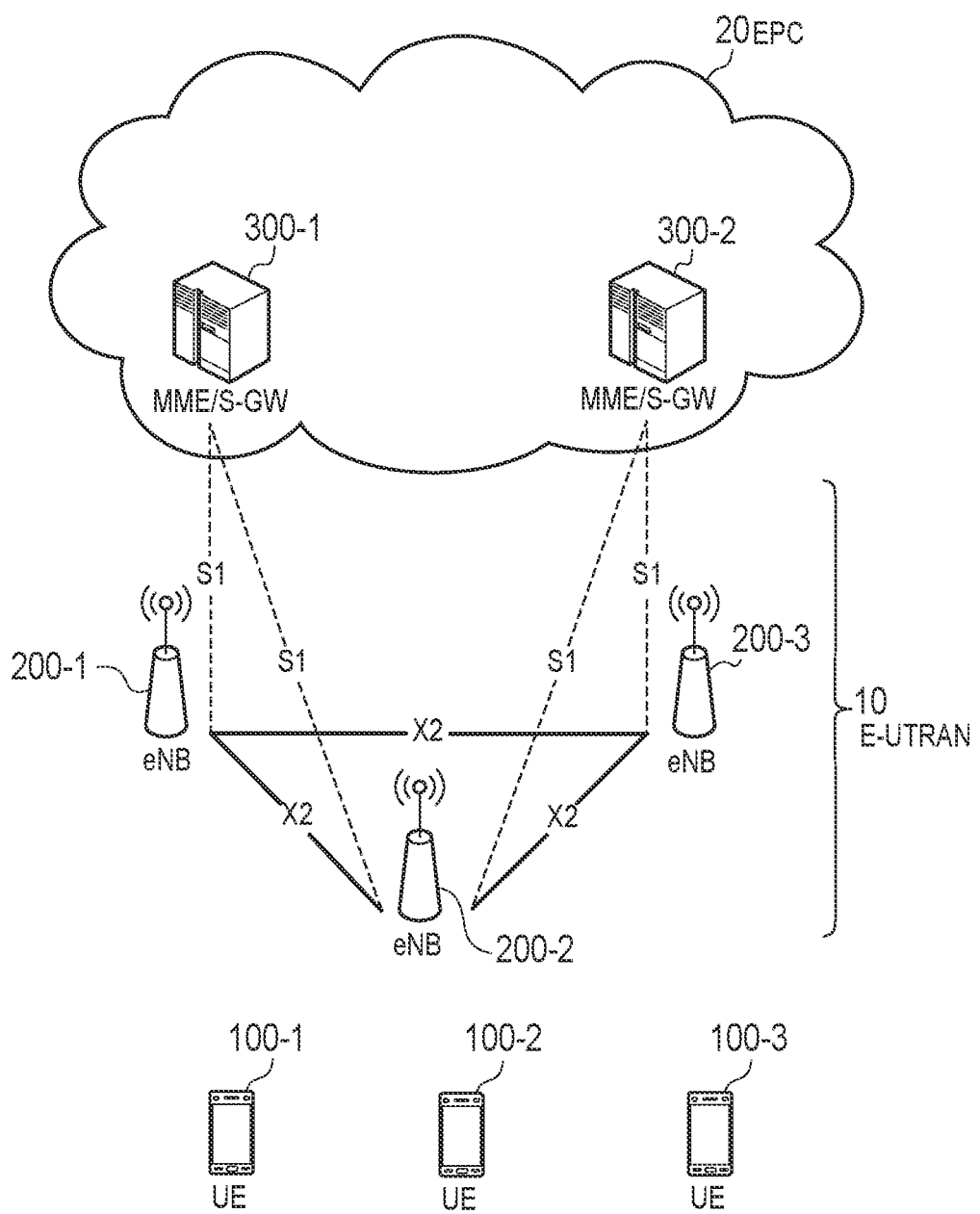
FIG. 1 is a diagram illustrating a configuration of an LTE system (mobile communications system) according to an embodiment.

A mobile communications system according to one embodiment will be described with reference to the drawings. In the description of the drawings hereinbelow, the same or similar reference numerals are assigned to the same or similar parts.

First Embodiment (Mobile Communications System)

The configuration of a mobile communications system according to the present embodiment will be described. FIG. 1 is a diagram illustrating a configuration of an LTE (Long Term Evolution) system which is the mobile communications system according to the present embodiment. The LTE system is a mobile communications system based on the 3GPP standard.

An LTE system is provided with a radio terminal (user equipment: UE) 100, a radio access network (evolved-UMTS terrestrial radio access network E-:UTRAN) 10, and a core network (evolved packet core: EPC) 20.

The UE 100 is a mobile-type communication apparatus. The UE 100 performs radio communications with an eNB 200 that manages the cell (serving cell) in which the UE 100 exists.

The E-UTRAN 10 includes base stations (evolved Node-B: eNB) 200. The eNB 200 are interconnected via an X2 interface. The eNB 200 manage one or a plurality of cells. The eNB 200 perform radio communications with the UEs 100 that have established a connection with their own cells. The eNB 200 have a radio resource management (RRM) function, a user data (hereinafter suitably called "data") routing function, and a measurement control function for mobility control and scheduling, and the like. "Cell" is used as a term indicating the smallest unit of a radio communications area. "Cell" is also used as a term indicating a function or resource that performs radio communications with the UE 100. One cell belongs to one carrier frequency.

The EPC 20 includes a mobility management entity (MME) and serving gateway (S-GW) 300. The MME performs various mobility control with respect to the UE 100, and the like. The MME manages information of a tracking area (TA) in which the UE 100 exists by using non-access stratum (NAS) signaling to communicate with the UE 100. The tracking area is an area comprising a plurality of cells. The S-GW performs data transfer control. The MME and S-GW are connected to the eNB 200 via an S1 interface.

Figure 2:
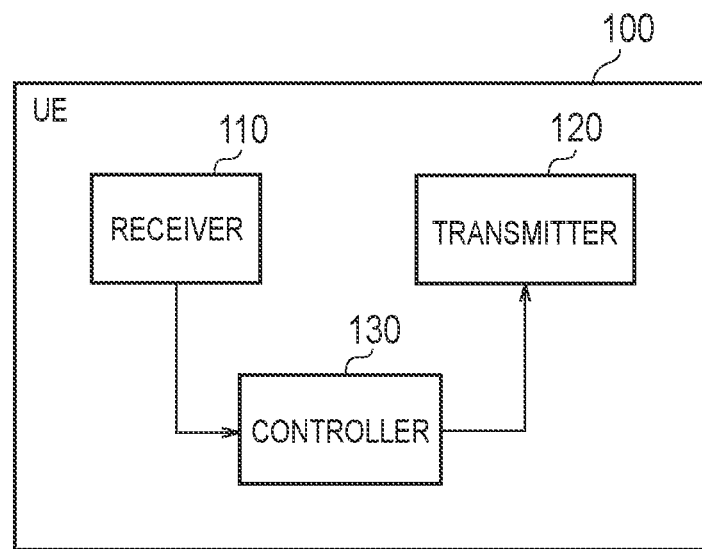
FIG. 2 is a diagram illustrating a configuration of a UE (radio terminal) according to the embodiment.

FIG. 2 is a diagram illustrating a configuration of the UE 100 (radio terminal). The UE 100 is provided with a receiver 110, a transmitter 120, and a controller 130.

The receiver 110 performs various reception under the control of the controller 130. The receiver 110 includes an antenna and a receiving set. The receiving set converts a radio signal received by the antenna to a baseband signal (reception signal) and outputs the baseband signal to the controller 130.

The transmitter 120 performs various transmission under the control of the controller 130. The transmitter 120 includes an antenna and a transmitting set. The transmitting set converts the baseband signal (transmission signal) output by the controller 130 to a radio signal and transmits the radio signal from the antenna.

The controller 130 performs various control of the UE 100. The controller 130 includes at least one processor and one memory. The memory stores a program executed by the processor and information used in processing by the processor. The processor may include a baseband processor and a central processing unit (CPU). The baseband processor performs modulation/demodulation and coding/decoding of baseband signals, and the like. The CPU performs various processing by executing the program stored in the memory. The processor executes processing that will be described subsequently.

Figure 3:
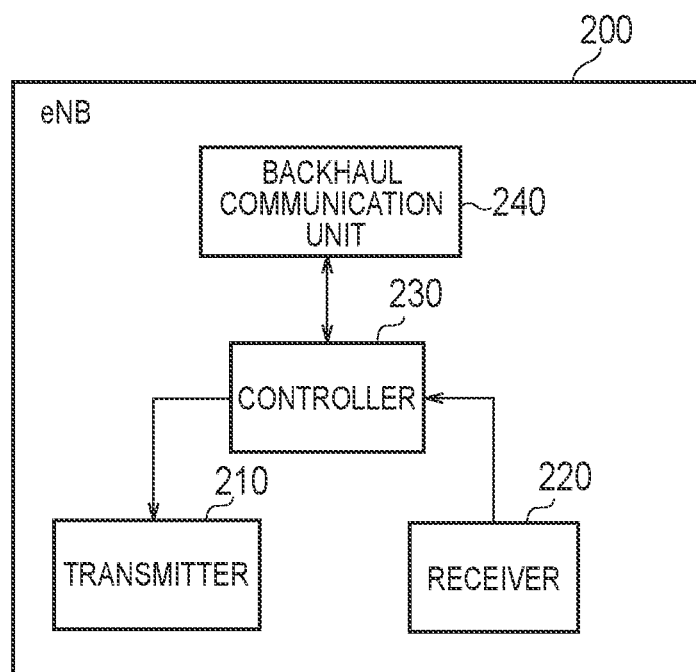
FIG. 3 is a diagram illustrating a configuration of an eNB (base station) according to the embodiment.

FIG. 3 is a diagram illustrating a configuration of the eNB 200 (base station). The eNB 200 is provided with a transmitter 210, a receiver 220, a controller 230, and a backhaul communications unit 240.

The transmitter 210 performs various transmission under the control of the controller 230. The transmitter 210 includes an antenna and a transmitting set. The transmitting set converts the baseband signal (transmission signal) output by the controller 230 to a radio signal and transmits the radio signal from the antenna.

The receiver 220 performs various reception under the control of the controller 230. The receiver 220 includes an antenna and a receiving set. The receiving set converts a radio signal received by the antenna to a baseband signal (reception signal) and outputs the baseband signal to the controller 230.

The controller 230 performs various control of the eNB 200. The controller 230 includes at least one processor and one memory. The memory stores a program executed by the processor and information used in processing by the processor. The processor may include a baseband processor and a CPU. The baseband processor performs modulation/demodulation and coding/decoding of baseband signals, and the like. The CPU performs various processing by executing the program stored in the memory. The processor executes processing that will be described subsequently.

The backhaul communications unit 240 is connected to an adjacent eNB via an X2 interface. The backhaul communications unit 240 is connected to an MME/S-GW 300 via an S1 interface. The backhaul communications unit 240 is used in communications performed via the X2 interface and communications performed via the S1 interface, and the like.

Figure 4:
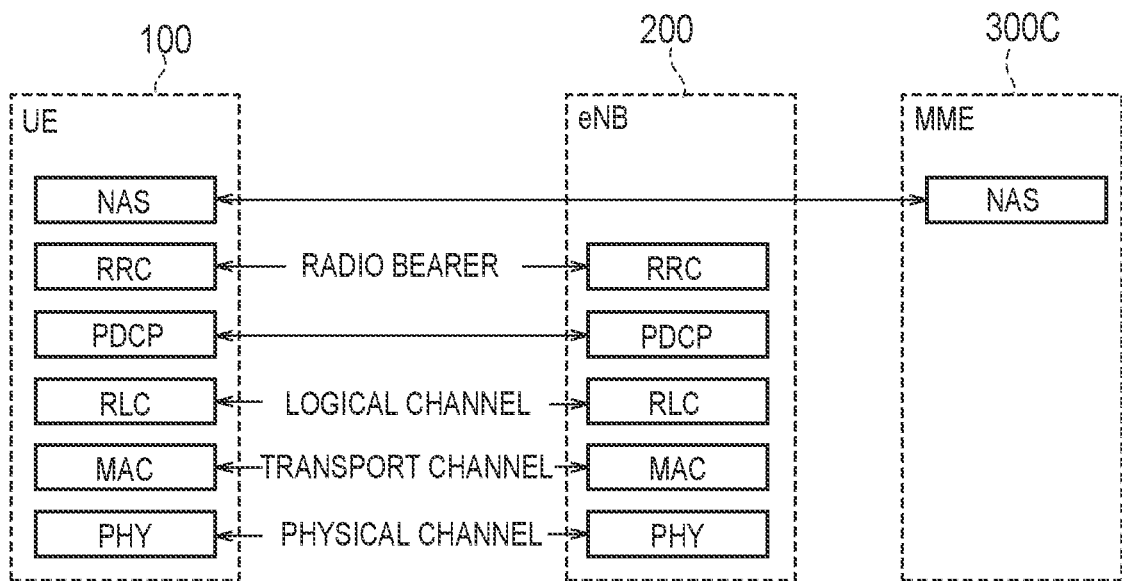
FIG. 4 is a diagram illustrating a protocol stack of a radio interface of an LTE system according to the embodiment.

FIG. 4 is a diagram illustrating a configuration of a protocol stack of a radio interface in an LTE system. As illustrated in FIG. 4, the radio interface protocol is divided into the first to third layers of an OSI reference model. The first layer is a physical (PHY) layer. The second layer includes a medium access control (MAC) layer, a radio link control (RLC) layer, and a packet data convergence protocol (PDCP) layer. The third layer includes a radio resource control (RRC) layer. The PHY layer, the MAC layer, the RLC layer, the PDCP layer, and the RRC layer constitute access stratum (AS) layers.

The PHY layer performs coding/decoding, modulation/demodulation, antenna mapping/demapping, and resource mapping/demapping. Data and control information are transmitted between the PHY layer of the UE 100 and the PHY layer of the eNB 200 via a physical channel.

The MAC layer performs data priority control, retransmission processing using hybrid ARQ (HARQ), and random access procedures, and the like. Data and control information are transmitted between the MAC layer of the UE 100 and the MAC layer of the eNB 200 via a transport channel. The MAC layer of the eNB 200 includes a scheduler. The scheduler determines the transport format (transport block size, modulation/coding system (MCS)) of uplinks and downlinks, and the resource blocks allocated to the UE 100.

The RLC layer uses the functions of the MAC layer and PHY layer to transmit data to the RLC layer on the receiving side. Data and control information are transmitted between the RLC layer of the UE 100 and the RLC layer of the eNB 200 via a logical channel.

The PDCP layer performs header compression/extension and encryption/decoding.

The RRC layer is defined only by a control plane that handles the control information. RRC signaling for various configuration is transmitted between the RRC layer of the UE 100 and the RRC layer of the eNB 200. The RRC layer controls the logical channel, transport channel, and physical channel according to the establishment, re-establishment, and release of a radio bearer. If there is a connection (RRC connection) between the RRC of the UE 100 and the RRC of the eNB 200, the UE 100 is in an RRC connected mode. When there is no connection (RRC connection) between the RRC of the UE 100 and the RRC of the eNB 200, the UE 100 is in an RRC idle mode.

A NAS layer, which is located on top of the RRC layer, performs session management and mobility management, and the like. NAS signaling is transmitted between the NAS layer of the UE 100 and the NAS layer of an MME 300C. Besides a radio interface protocol, the UE 100 has an application layer function or another such function.

Figure 5:
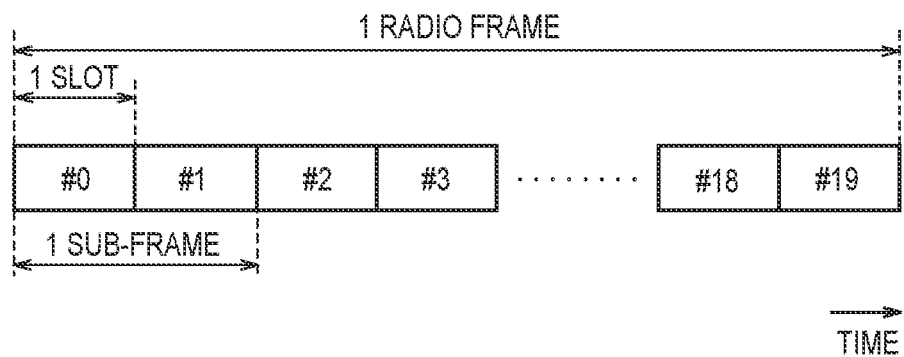
FIG. 5 is diagram illustrating a configuration of a radio frame of the LTE system according to the embodiment.

FIG. 5 is a diagram illustrating a configuration of a radio frame used in an LTE system. The radio frame is configured from ten subframes on a time axis. The subframes are each configured from two slots on the time axis. The length of each subframe is 1 ms. The length of each slot is 0.5 ms. Each subframe contains a plurality of resource blocks (RB) on a frequency axis. Each subframe contains a plurality of symbols on the time axis. Each resource block contains a plurality of subcarriers on the frequency axis. More specifically, one RB is configured from twelve subcarriers and one slot. One resource element (RE) is configured from one symbol and one subcarrier. Among the radio resources (time/frequency resources) allocated to the UE 100, the frequency resources can be specified by means of resource blocks and the time resources can be specified by means of subframes (or slots).

In a downlink, an interval of the first few symbols of each subframe is a region mainly used as a physical downlink control channel (PDCCH) for transmitting downlink control information. The remainder of each subframe is a region that can be used mainly as a physical downlink shared channel (PDSCH) for transmitting downlink data.

In an uplink, both ends in the frequency direction of each subframe are regions which are mainly used as a physical uplink control channel (PUCCH) for transmitting uplink control information. The remainder of each subframe is a region that can be mainly used as a physical uplink shared channel (PUSCH) for transmitting uplink data.

(eMTC and NB-IoT Overview)

An eMTC and NB-IoT overview will now be described. In the present embodiment, a scenario is assumed where new-category UEs 100 which are directed toward MTC and IoT services exist. The new-category UEs 100 are UEs 100 for which transmission/reception bandwidths are restricted only in a portion of the system transmission/reception frequency bands (LTE transmission/reception bandwidths). The new UE categories are called category M1 and category narrow band (NB)-IoT, for example. Category M1 is a category to which enhanced Machine Type Communications (eMTC) UEs belong. Category NB-IoT (category NB1) is a category to which NB-IoT UEs belong. Category M1 restricts the transmission/reception bandwidths of the UEs 100 (eMTC UEs) to 1.08 MHz (that is, a six resource block bandwidth), for example. Category NB-IoT (category NB1) further restricts the transmission/reception bandwidths of the UEs 100 (NB-IoT UE) to 180 kHz (that is, a one resource block bandwidth). By changing to this narrow band, low costs and low power consumption, which are required for eMTC UEs and NB-IoT UEs, can be realized.

Figure 6:
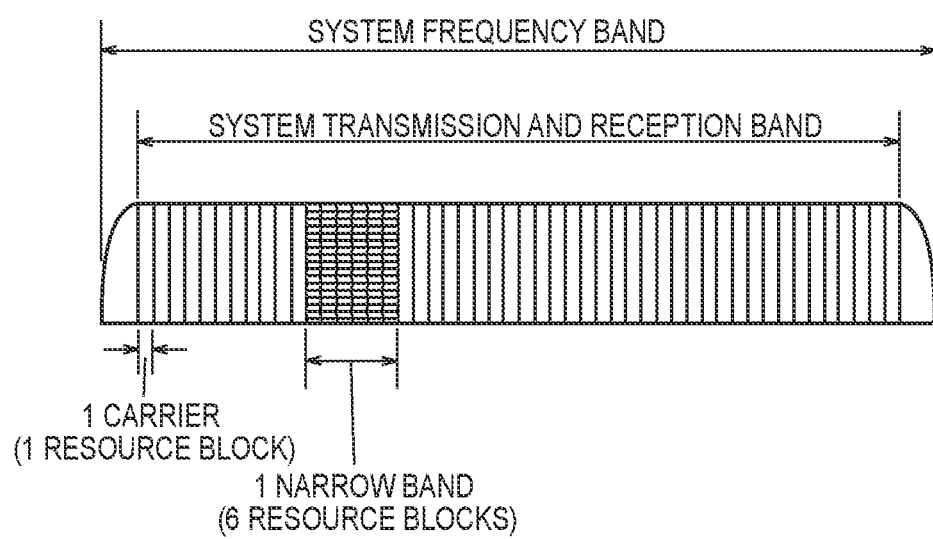
FIG. 6 is a diagram illustrating an example of a frequency channel handled by an eMTC UE and an NB-IoT UE.

FIG. 6 is a diagram illustrating frequency channels that are handled by eMTC UEs and NB-IoT UEs. As illustrated in FIG. 6, the frequency bandwidth for the system frequency bands of an LTE system can be 10 MHz. The bandwidth of the system transmission/reception bands is 50 resource blocks=9 MHz, for example. The bandwidth of a frequency channel with which an eMTC UE is compatible is equal to or less than six resource blocks=1.08 MHz. A frequency channel of no more than six resource blocks with which an eMTC UE is compatible is called "narrowband (NB)". The bandwidth of a frequency channel with which an NB-IoT UE is compatible is one resource block=180 kHz. A single resource block frequency channel with which an NB-IoT UE is compatible is called a "carrier."

An eMTC UE is operated in an LTE transmission/reception bandwidth. The NB-IoT UE supports modes operated in an LTE transmission/reception bandwidth, modes operated in a guard band outside the LTE transmission/reception bandwidth, and modes operated in frequency bands dedicated to NB-IoT.

In order to implement expanded coverage, the eMTC UEs and NB-IoT UEs support an enhanced coverage (EC) function which uses repeated transmissions and the like. The enhanced coverage function may also include repeated transmission (repetition) in which the same signal is repeatedly transmitted using a plurality of subframes. The greater the number of repeated transmissions, the more coverage can be expanded. The enhanced coverage function may also include power boosting in which the power density of a transmission signal is raised. By way of an example, the power density is raised by means of narrowband transmission in which the frequency bandwidth of the transmission signal is narrowed. The more the power density of the transmission signal is raised, the more the coverage can be expanded. The enhanced coverage function may also include lower MCS transmission in which the MCS used for the transmission signal is lowered. Coverage can be expanded by performing transmission using an MCS with a low data rate and a high fault tolerance.

(Overview of Random Access Procedure)

Figure 7:
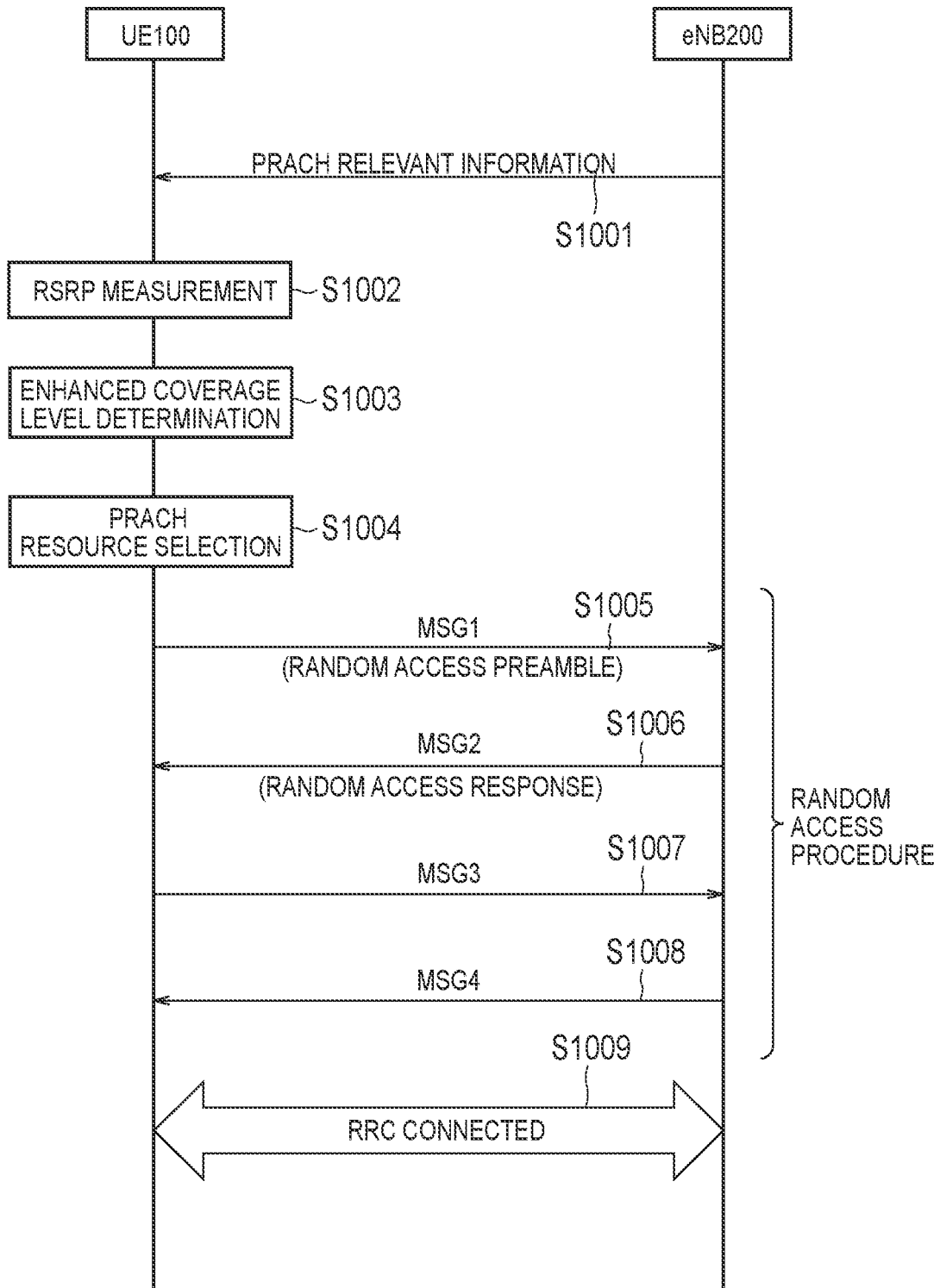
FIG. 7 is a diagram illustrating an example of a random access procedure for an eMTC UE and an NB-IoT UE.

FIG. 7 is a diagram illustrating a random access procedure for eMTC UEs and NB-IoT UEs. In an initial state, the UE 100 is in RRC idle mode. The UE 100 executes the random access procedure in order to transition to RRC connected mode. Such a case is called an initial connection (initial access from RRC_IDLE). At the time of an initial connection, a contention-based random access procedure is applied.

The UE 100 selects an eNB 200 cell as the serving cell. The UE 100 may also determine that same lies within enhanced coverage if a first cell selection criterion (a first S-criteria) for normal coverage is not satisfied and a second cell selection criterion (a second S-criteria) for enhanced coverage is satisfied. A "UE lying within enhanced coverage" signifies a UE which is required to use an enhanced coverage function (enhanced coverage mode) to access the cell. Note that an eMTC UE must use an enhanced coverage mode. Here, the description will be continued on the assumption that the UE 100 lies within enhanced coverage.

In step S1001, the eNB 200 transmits physical random access channel (PRACH)-related information by means of broadcast signaling (SIB, for example). The PRACH-related information includes various parameters provided for each enhanced coverage level. By way of an example, a total of four levels, namely, enhanced coverage levels 0 to 3, are defined as enhanced coverage levels. The various parameters include a reference signal received power (RSRP) threshold value, PRACH resources, and a maximum preamble transmission count. The PRACH resources include radio resources (time/frequency resources) and a signal sequence (preamble sequence). The UE 100 stores the received PRACH-related information.

In step S1002, the UE 100 measures the RSRP on the basis of a reference signal that is transmitted from the eNB 200.

In step S1003, the UE 100 determines its own enhanced coverage level (CE level) by comparing the measured RSRP with the RSRP threshold value for each enhanced coverage level. The enhanced coverage level indicates the extent of the enhanced coverage required by the UE 100. The enhanced coverage level relates to at least the transmission count (that is, the number of repetitions) for repeated transmissions.

In step S1004, the UE 100 selects the PRACH resource corresponding to its own enhanced coverage level.

Steps S1005 to S1008 constitute the random access procedure. In step S1005, the UE 100 uses the selected PRACH resource to transmit a Msg 1 (random access preamble) to the eNB 200. Note that "Msg" is an abbreviation for message. The eNB 200 specifies the enhanced coverage level of the UE 100 on the basis of the PRACH resource used for the received Msg 1.

In step S1006, the eNB 200 transmits, to the UE 100, a Msg 2 (random access response) including scheduling information indicating a PUSCH resource allocated to the UE 100. Until receiving Msg 2 normally, the UE 100 is able to transmit Msg 1 multiple times up to a maximum preamble transmission count that corresponds to its own enhanced coverage level.

In step S1007, the UE 100 transmits a Msg 3 to the eNB 200 on the basis of scheduling information. Msg 3 may be an RRC connection request message.

In step S1008, the eNB 200 transmits a Msg 4 to the UE 100. Msg 4 may also be an RRC connection establishment (RRC connection setup) message.

In step S1009, the UE 100 transitions to RRC connected mode in response to receiving Msg 4. Thereupon, the UE 100 may transmit a Msg 5: RRC connection establishment completion (RRC connection setup complete) message to the eNB 200. Thereafter, the eNB 200 controls the repeated transmissions to the UE 100, and the like, on the basis of the specified enhanced coverage level.

(Overview of Early Data Transmission)

An eMTC UE or NB-IoT UE has a small volume of data to be transmitted and received and transmits and receives data infrequently. In the present embodiment, an example is described in which early data transmission (EDT), in which an eMTC UE or NB-IoT UE uses a predetermined message during the random access procedure to transmit and receive user data, is performed.

EDT includes uplink EDT, in which uplink data is transmitted and received by using Msg 3 in the random access procedure, and downlink EDT, in which downlink data is transmitted and received by using Msg 4 in the random access procedure. More specifically, cases include those where both uplink EDT and downlink EDT are implemented in one random access procedure, where only uplink EDT is implemented, and where only downlink EDT is implemented.

There are two varieties of EDT, namely, the user plane (UP) solution and the control plane (CP) solution. In the case of the UP solution, in the EDT, instead of user data (DTCH) being contained in an RRC message (CCCH), the user data and RRC message are multiplexed and transmitted in a single MAC PDU in the MAC layer. On the other hand, in the case of the CP solution, user data is contained in the RRC message in the EDT.

The UP solution is applied when the UE 100 is in a suspend state, which is a substate of the RRC idle mode. The suspend state is a substate of the RRC idle mode in which context information of the UE 100 is maintained in the eNB 200. In the case of the UP solution, the RRC message constituting Msg 3 is an RRC connection resume request message, and the RRC message constituting Msg 4 is basically an RRC connection release message or RRC connection reject message. Upon receiving an RRC connection release message, the UE 100 ends the random access procedure while still maintaining RRC idle mode. However, the RRC message constituting Msg 4 may be an RRC connection resume message. Upon receiving an RRC connection resume message, the UE 100 transitions to RRC connected mode and transmits and receives user data in RRC connected mode.

The CP solution is applied to cases where the UE 100 is in RRC idle mode and not in a suspend state. In the case of the CP solution, the RRC message constituting Msg 3 is an early data request message and the RRC message constituting Msg 4 is basically an early data complete message. Upon receiving an early data complete message, the UE 100 ends the random access procedure while still maintaining RRC idle mode. However, the RRC message constituting Msg 4 may be an RRC connection setup message. Upon receiving an RRC connection setup message, the UE 100 transitions to RRC connected mode and transmits and receives user data in RRC connected mode.

(Operation According to First Embodiment)

In EDT, after using Msg 3 to transmit uplink data, the UE 100 is capable of using Msg 4 to receive downlink data and of ending the random access procedure while still maintaining RRC idle mode. Accordingly, the UE 100 is capable of transmitting/receiving user data without transitioning to the RRC connected mode, and hence the power consumption of the UE 100 can be reduced.

However, if downlink EDT is performed using Msg 4, the eNB 200 is not capable of transmitting Msg 4 to the UE 100 until the eNB 200 receives the downlink data from the core network side. As a result, a timer for defining the maximum wait time for receiving Msg 4 in the UE 100 expires, and the UE 100 is capable of determining that the random access procedure has failed. If the UE 100 determines that the random access procedure has failed, the UE 100 restarts the random access procedure from the beginning. In this case, the power consumption of the UE 100 increases.

The timer for defining the maximum wait time for receiving Msg 4 may be a T300, which is managed in the RRC layer of the UE 100, or may be a contention resolution timer for management in the MAC layer of the UE 100. Although an example in which the timer is T300 is described in the present embodiment, the timer may also be a contention resolution timer.

The UE 100 starts the T300 when transmitting Msg 3. The value (timer value) of T300 is configured for the UE 100 by the eNB 200 by using SIB. The UE 100 determines that the random access procedure has failed when T300 expires without a Msg 4 addressed to itself being received.

According to the first embodiment, prior to starting the random access procedure, the UE 100 derives a prediction value for the time period required until the UE 100 receives user data together with Msg 4 from transmitting Msg 3. More specifically, if it is assumed that downlink EDT has been carried out, the UE 100 determines the extent of the time period required (the required time period) until Msg 4 will be received from transmitting Msg 3.

The UE 100 determines whether or not to start a random access procedure involving EDT (specifically, downlink EDT) on the basis of the T300 timer value received from the eNB 200 and the derived prediction value. For example, the UE 100 determines to not start a random access procedure involving EDT if the derived prediction value is greater than the T300 timer value received from the eNB 200. Accordingly, because the likelihood of the T300 expiring without the UE 100 receiving a Msg 4 addressed to itself can be reduced, it is possible to curb an increase in the power consumption of the UE 100.

Figure 8:
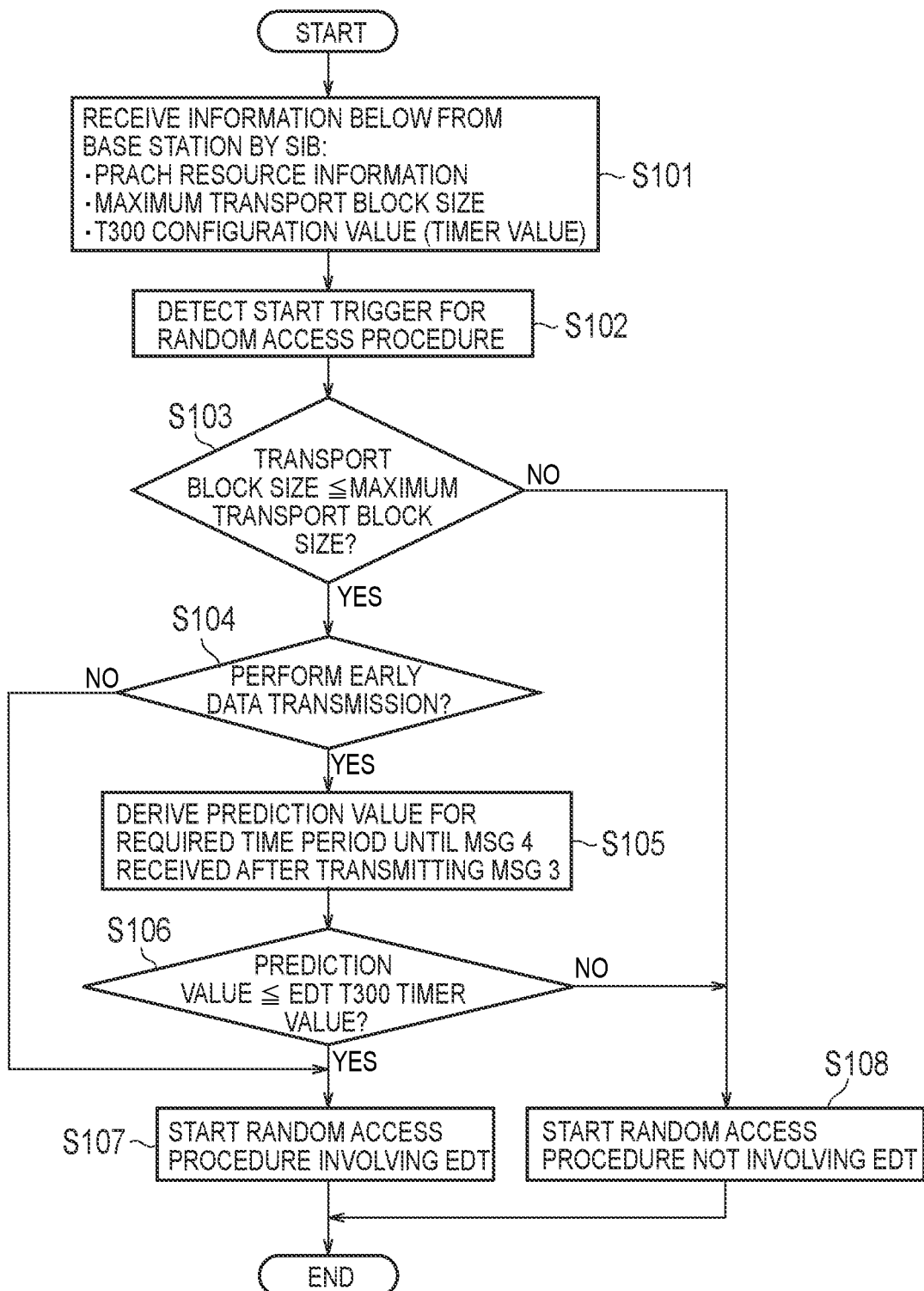
FIG. 8 is a diagram illustrating an example of UE operations according to a first embodiment.

FIG. 8 is a diagram illustrating an example of the operation of the UE 100 according to the first embodiment.

As illustrated in FIG. 8, in step S101, the UE 100, which is in RRC idle mode, receives the following information 1) to 3) from the eNB 200 by means of SIB. Alternatively, in the RRC connected mode prior to entering the RRC idle mode, the UE 100 may still retain the following information 1) to 3) from receiving this information from the eNB 200 by means of an RRC message and transitioning to the RRC idle mode.

1) PRACH Resource Information:

A portion of the PRACH resources available in the cell of the eNB 200 is secured as an EDT indication-PRACH resource. For example, a portion of the time period/frequency resources available as PRACH resources in the cell of the eNB 200 is secured as a time period/frequency resource for the EDT indication. The eNB 200 broadcasts information indicating the PRACH resource (time period/frequency resource) for the EDT indication by means of SIB. The UE 100 determines that EDT is available if an EDT-indication PRACH resource is provided. On the other hand, the UE 100 determines that EDT is unavailable if an EDT-indication PRACH resource is not provided. Here, a description is provided on the assumption that an EDT-indication PRACH resource is provided.

2) Maximum Transport Block Size of User Data in EDT:

The eNB 200 uses SIB to broadcast information indicating the maximum uplink data volume (the maximum transport block size) which the UE 100 is capable of transmitting in uplink EDT. The eNB 200 may also use SIB to broadcast information indicating the maximum downlink data volume (the maximum transport block size) which the UE 100 is capable of transmitting in downlink EDT.

3) T300 Configuration Value (Timer Value):

The value (timer value) of T300 is configured for the UE 100 by the eNB 200 by using SIB. The eNB 200 configures, individually for the UE 100, a timer value (hereinafter called the "first timer value") of the T300 for a random access procedure not involving EDT and a timer value (hereinafter called the "second timer value") of the T300 for a random access procedure involving EDT.

In step S102, the UE 100 detects a start trigger for a random access procedure. For example, the UE 100 determines to start a random access procedure in response to uplink data which is to be transmitted being generated in the UE 100 or in response to the UE 100 receiving a paging message. Note that the processing of step S102 may also be executed before step S101. Note that if the processing of step S102 is executed before the processing of step S101, the UE 100 may, after detecting the start trigger for the random access procedure, await the start of the processing of step S103 until the information 1) to 3) above is received by means of SIB from the eNB 200.

In step S103, the UE 100 determines whether or not the uplink data volume which the UE 100 is about to transmit to the eNB 200 is equal to or smaller than the maximum uplink data volume. The UE 100 may also determine whether or not the downlink data volume which the UE 100 is about to receive from the eNB 200 is equal to or smaller than the maximum downlink data volume. If step S103 yields "NO," the UE 100 starts, in step S108, a random access procedure not involving EDT. More specifically, the UE 100 does not transmit an EDT indication when transmitting Msg 1 in the random access procedure. Note that even when step S103 yields "NO," because it is likely that only downlink EDT will be executed, the UE 100 may advance to step S104.

If step S103 yields "YES," in step S104 the UE 100 determines whether or not to perform downlink EDT. For example, the UE 100 determines to not perform downlink EDT if, at the time of Msg 3 transmission, uplink user data (UDP data and the like) not requiring ACK is transmitted. The UE 100 determines to perform downlink EDT if, at the time of Msg 3 transmission, uplink user data (TCP data and the like) requiring ACK is transmitted. If step S104 yields "NO," the processing of steps S105 and S106 is omitted and the UE 100 advances to the processing of step S107. For example, if the assumption is made that transmission using UDP is performed and that, based on the application type, there is no response (ACK or other downlink data) to the uplink EDT from the server, the UE 100 determines to not execute downlink EDT and executes uplink EDT in step S107. Note that, if the assumption is made that there is no response to the uplink EDT from the server, the UE 100 need not start T300 for a random access procedure involving EDT at the time of Msg 3 transmission.

If step S104 yields "YES," in step S105 UE 100 derives a prediction value for the required time period until user data will be received together with Msg 4 from Msg 3 is transmitted. More specifically, if it is assumed that downlink EDT has been carried out, the UE 100 determines the extent of the time period required (the required time period) until Msg 4 will be received from transmitting Msg 3. For example, the UE 100 derives a prediction value for the required time period on the basis of at least one of the following a) to d).

a) Application Type and/or Protocol Type Used in a Higher Layer than UE 100 Access Layer:

For example, the UE 100 may determine that, if the QoS request of an application is high (that is, in the case of low latency), the response (Msg 4) is fast (in other words, the time period (the time required) until the UE 100 receives the response (Msg 4) from the eNB 200 from transmitting the Msg 3 to the eNB 200 is short), and that, if the QoS request of an application is low (that is, high latency), the response (Msg 4) is slow (in other words, the time period (the time required) until the UE 100 receives the response (Msg 4) from the eNB 200 from transmitting the Msg 3 to the eNB 200 is long). Alternatively, the prediction value for the required time period corresponding to the application type and/or protocol type is configured for the UE 100 beforehand, and this preconfigured prediction value for the required time period may be acquired. This processing may also be executed in the AS layer of the UE 100 (more specifically, the RRC layer and lower layers), or may be executed in an upper layer of the UE 100 (more specifically, a layer above the RRC).

b) Bearer Type and/or Logical-Channel Type Used in Access Layer (AS Layer) of UE 100:

For example, a prediction value for the required time corresponding to the bearer type and/or logical-channel type (that is, a prediction value for the time period (required time period) until Msg 4 will be received from transmitting Msg 3) is configured for the UE 100 beforehand, and the UE 100 acquires this preconfigured prediction value for the required time. This determination may also be executed in the AS layer of the UE 100. Note that the bearer is associated with a QoS request and that the logical channel is associated with the bearer.

c) Statistics Using a History of the Required Time Period in the Past:

The UE 100 stores a history of the required time period in the past (more specifically, the time period actually required until user data was received together with Msg 4 from transmitting Msg 3), and by executing statistical processing of this history, calculates a prediction value for the current required time period. This determination may also be executed in the AS layer of the UE 100.

d) Volume of Uplink User Data which UE 100 Transmits to eNB 200 by Means of EDT and/or Volume of Downlink User Data which UE 100 Receives from eNB 200 by Means of EDT:

For example, because the processing time period on the server side varies according to the uplink user data volume, the UE 100 may determine that the higher the uplink user data volume, the slower the response (Msg 4) (that is, the longer the time period (required time period) until the UE 100 receives the response (Msg 4) from the eNB 200 from transmitting Msg 3 to the eNB 200). Alternatively, the AS layer of the UE 100 may estimate the application according to the uplink user data volume and perform processing like a) above. The UE 100 could also determine that the higher the downlink user data volume, the slower the response (Msg 4) (that is, the longer the time period (required time period) until the UE 100 receives the response (Msg 4) from the eNB 200 from transmitting Msg 3 to the eNB 200).

In step S106, the UE 100 determines whether or not the prediction value for the required time period derived in step S105 is equal to or smaller than the timer value (second timer value) received in step S101.

If step S106 yields "YES," in step S107 the UE 100 starts a random access procedure involving EDT (at least downlink EDT). More specifically, the UE 100 transmits an EDT indication when transmitting Msg 1 in the random access procedure. Note that, if the UE 100 has determined in step S104 to not execute downlink EDT, the UE 100 may report the fact that downlink EDT will not be executed to the eNB 200 at the time of transmitting Msg 3 or Msg 1. Thus, because the eNB 200 is capable of transmitting Msg 4 quickly, it is possible to prevent an increase in the load caused by a processing delay, and the power consumption while the UE 100 is on standby can be minimized. Information to the effect that downlink EDT will not be executed may be a flag ("no DL data expected" or the like, for example) contained in an RRC message or the information may be conveyed by means of a MAC subheader of a MAC Control Element (CE).

If step S106 yields "NO," in step S108 the UE 100 starts a random access procedure not involving EDT. More specifically, the UE 100 does not transmit an EDT indication when transmitting Msg 1 in the random access procedure.

Summary of First Embodiment

The operation according to the foregoing first embodiment can be summarized as follows.

A communication control method for controlling EDT in which user data is transmitted and received during a random access procedure comprises: a step A (step S101) in which a UE 100 receives, from an eNB 200, a timer value for configuring a maximum wait time period until the UE 100 receives a Msg 4 from transmitting a Msg 3 during a random access procedure; a step B (step S105) in which the UE 100 derives a prediction value for a required time period until the UE 100 receives Msg 4 from transmitting Msg 3; and a step C (step S106) in which the UE 100 determines whether or not to start a random access procedure involving EDT on the basis of the timer value received in step A and the prediction value derived in step B.

In step C, the UE 100 determines to not start a random access procedure involving EDT if the prediction value derived in step B is larger than the timer value received in step A (step S106: NO).

The UE 100 starts a random access procedure not involving EDT in response to having determined in step C to not start a random access procedure involving EDT (step S108).

In step B, the UE 100 derives a prediction value on the basis of at least one of a) an application type and/or protocol type used in a higher layer than the access layer of the UE 100, b) a bearer type and/or logical-channel type used in the access layer of the UE 100, c) statistics using a history of the required time period in the past, and d) the volume of uplink user data which the UE 100 transmits to the eNB 200 by means of EDT and/or the volume of downlink user data which the UE 100 receives from the eNB 200 by means of EDT.

The UE 100 determines whether or not to perform downlink EDT in which downlink user data is received together with Msg 4 from the eNB 200 (step S104). The UE 100 executes step C only if it is determined that downlink EDT will be performed (step S104: YES).

Modified Example 1 of First Embodiment

In the foregoing first embodiment, an example was described in which, if the UE 100 has determined to not perform downlink EDT, the UE 100 reports the fact that downlink EDT will not be performed to the eNB 200. Details of this operation will be described in this modified example.

More specifically, the UE 100 starts a random access procedure involving uplink EDT. If the UE 100 has determined to not perform downlink EDT in the random access procedure, the UE 100 reports the fact that downlink EDT will not be performed to the eNB 200 during the random access procedure.

Here, "that downlink EDT will not be performed" means that there is no upper layer response to data transmitted in the uplink EDT. Note that upper layer means a layer higher than the RRC layer. If UDP transmission is to be performed in uplink EDT (that is, if there is no TCP ACK), the UE 100 may determine to not perform downlink EDT. The UE 100 may also determine to not perform downlink EDT upon learning from an upper layer (the application layer, for example) that there is no upper layer response. The UE 100 may determine to not perform downlink EDT if it is determined that there is no response (in the AS layer or the NAS layer) on the basis of past application layer behavior (data transmission/reception history and so forth).

The UE 100 may also report, by means of Msg 3, that downlink EDT will not be performed. As a buffer state report (BSR) transmitted to the eNB 200 at the time of Msg 3 transmission, the UE 100 may transmit BSR (BSR=0), which indicates that the available uplink data is zero. The eNB 200 interprets this BSR as a report indicating that the UE 100 will not perform downlink EDT. Alternatively, the UE 100 may, using a MAC CE, issue a report to the eNB 200 that downlink EDT will not be performed or may issue this report using only a MAC subheader (without a MAC CE portion). Alternatively, the UE 100 may issue a report to the eNB 200 by adding a flag indicating that downlink EDT will not be performed to an RRC message (RRC connection request/resume request) constituting Msg 3.

The UE 100 may also issue a report indicating that downlink EDT will not be performed by means of Msg 1. For example, the UE 100 transmits a random access preamble (EDT indication) by using a PRACH resource which has been secured for reporting an uplink-only EDT.

Thus, as a result of the UE 100 reporting to the eNB 200 that downlink EDT will not be performed, the eNB 200 is capable of rapidly releasing the UE 100 as mentioned earlier. Thus, the eNB 200 is capable of releasing resources (eNB calculation processing resources, radio resources) at an early stage. Furthermore, the UE 100 is capable of keeping power consumption to a minimum (is capable of minimizing power consumption accompanying standby).

Modified Example 2 of First Embodiment

In the foregoing first embodiment, the UE 100 derives a prediction value for the time required until user data is received together with Msg 4 from transmitting Msg 3 and determines whether or not to start a random access procedure involving EDT (specifically downlink EDT) on the basis of the T300 timer value received from the eNB 200 and the derived prediction value. Here, it is assumed that the T300 timer value configured by the eNB 200 is basically fixed.

However, the T300 timer value configured by the eNB 200 is likely to be too short. When, on the other hand, the T300 timer value configured by the eNB 200 is too long, there is a risk that making a suitable determination of random access failure will not be possible. Therefore, in this modified example, the eNB 200 is capable of suitably configuring the T300 timer value as a result of the UE 100 providing information to the eNB 200.

In this modified example, the UE 100 determines a value (recommended timer value) that is recommended as the timer value for configuring the maximum wait time period until the UE 100 receives Msg 4 from transmitting Msg 3 during the random access procedure. The timer value is an EDT T300 value. Alternatively, the timer value may also be a timer value of a contention resolution timer. The UE 100 may determine the recommended timer value on the basis of the same prediction as in the foregoing first embodiment or may determine the recommended timer value on the basis of past results (history).

Further, the UE 100 transmits information indicating the recommended timer value to the eNB 200 while the UE 100 is in RRC connected mode. The UE 100 includes the recommended timer value in the RRC message transmitted to the eNB 200, for example. The eNB 200 collects recommended timer values from a plurality of UEs 100, determines suitable T300 values by performing statistical processing of the collected recommended timer values, and transmits the determined T300 values by means of SIB.

Second Embodiment

A second embodiment will now be described with a focus on points of difference from the first embodiment.

Operation According to Second Embodiment

If a multiplicity of UEs 100 (eMTC UEs and NB-IoT UEs in particular) exist under the control of the eNB 200, the load on the eNB 200 (the radio resource load in particular) is then significant. In this situation, there is large number of UEs 100 that use EDT-indication PRACH resources, and contention between the UEs 100 is generated as a result of a plurality of UEs 100 selecting the same PRACH resource.

This contention is resolved by means of Msg 4 by using a mechanism for contention resolution in a random access procedure, but a portion of the UEs 100 between which PRACH resource contention exists must restart the random access procedure from the beginning and hence the power consumption of the UEs 100 increases. In particular, if this portion of the UEs 100 have transmitted uplink user data by means of uplink EDT, transmission of the uplink user data is then futile.

According to the second embodiment, the eNB 200 transmits a regulation signal for stochastically regulating EDT (hereinafter called the "EDT regulation signal") on the basis of its own load state. The eNB 200 may also transmit (broadcast) the EDT regulation signal by means of SIB. Accordingly, the probability of contention occurring between UEs 100 using EDT (more specifically, contention regarding PRACH resources) can be reduced. The eNB 200 may, while in a heavy load state, transmit the EDT regulation signal periodically. Furthermore, the eNB 200 may transmit an EDT regulation signal individually only to those UEs 100 for which EDT is to be regulated (UEs 100 with a comparatively high data transmission volume or low-priority UEs 100). Moreover, the eNB 200 may transmit (broadcast) the EDT regulation signal by means of SIB in addition to transmitting the EDT regulation signal individually. In this case, the conditions for making the EDT associated with the respective EDT regulation signals available (EDT availability conditions) may be made the same or different. For example, an EDT availability condition associated with an individually transmitted EDT regulation signal may be a condition under which UE 100-dependent EDT is regulated with a higher probability than for an EDT availability condition associated with an EDT regulation signal transmitted by means of SIB.

Here, the load state of the eNB 200 may be a resource load state or may be a hardware load state. Furthermore, a resource load state includes the frequency of occurrence of contention between UEs with respect to the PRACH resource (Msg 1). The eNB 200 determines the frequency of this contention occurrence as follows. In specific terms, the eNB 200 determines the presence or absence of Msg 1 contention according to whether or not contention resolution is complete. For example, two UEs transmit the same random access preamble (EDT indication), and the eNB 200 successfully receives the random access preambles and sends back Msg 2. In this case, the two UEs use the PUSCH to transmit Msg 3 that contains different random IDs. At such time, if the eNB 200 is not capable of receiving the PUSCH by means of the resource designated by a UL grant (Msg 2), contention between the random access preambles (EDT indications) can be determined. However, the eNB 200 may also successfully receive only the Msg 3 transmitted by one of the UEs. In this case, because contention resolution is carried out by means the Msg 4 transmitted by the eNB 200 to the one UE, it is not possible to determine whether contention has occurred. However, the eNB 200 understands the configuration of the random access preamble and, on the basis of Msg 1, which is received simultaneously, for example, is capable of inferring that the likelihood of contention arising is high because of known constraints on the PRACH space (the PRACH resource).

Note that stochastic regulation means regulating EDT only for a randomly determined portion of the UEs 100 without collective regulation of EDT for all the UEs 100. EDT is regulated only for this portion of the UEs 100, and because the random access procedure itself is not regulated, a random access procedure not involving EDT can be executed.

The UEs 100 performing a random access procedure not involving EDT transition to RRC connected mode as a result of the random access procedure. However, the UEs 100 performing a random access procedure involving EDT are capable of ending the random access procedure while still maintaining RRC idle mode, and hence the power consumption of the UEs 100 ends up being small.

A UE 100 determines whether or not EDT is available for the UE 100 on the basis of the EDT regulation signal received from the eNB 200. The UE 100 starts a random access procedure involving EDT in response to the determination that EDT is available. On the other hand, the UE 100 may start a random access procedure not involving EDT in response to the determination that EDT is not available.

FIG. 9 is a diagram illustrating an example of the operation of the UE 100 according to the second embodiment. A description of operations overlapping with the operations of the UE 100 illustrated in FIG. 8 is omitted.

As illustrated in FIG. 9, the processing of steps S201 to S203 is the same as the operation of the UE 100 illustrated in FIG. 8.

If step S203 yields "YES," in step S204 the UE 100 determines whether or not the EDT regulation signal has been received from the eNB 200. If step S204 yields "NO," in step S207 the UE 100 starts a random access procedure involving EDT. More specifically, the UE 100 transmits an EDT indication when transmitting Msg 1 in the random access procedure.

On the other hand, if step S204 yields "YES," in step S205 the UE 100 determines whether or not EDT is available to the UE 100. The EDT regulation signal is associated with the condition that makes the EDT available. This EDT availability condition may be information that is included in the EDT regulation signal and may be preconfigured for the UE 100. In the present embodiment, an example in which the EDT availability condition is contained in the EDT regulation signal is described.

The UE 100 determines whether or not a self-generated random number and/or an identifier (UE-ID) relating to the UE 100 satisfies a condition. The identifier (UE-ID) relating to the UE 100 is an international mobile subscriber identity (IMSI) stored in a SIM of the UE 100, for example. However, an identifier other than an IMSI may also be used for the identifier relating to the UE 100.

The UE 100 may also compare the self-generated random number with a threshold value designated by the eNB 200 and may, according to the comparison result, determine whether EDT can be used. For example, the UE 100 may determine that EDT is available only in cases where the generated random number exceeds the threshold value.

Alternatively, the UE 100 may calculate "UE-ID mod N" and determine whether EDT can be used according to whether or not the calculation result is a certain numerical value or lies within a certain range of numerical values. Here, "N" and/or "numerical value (or range of numerical values)" may be designated by the eNB 200. The "numerical value (or range of numerical values)" may be any fixed value or may be a variable such as a radio frame number, or the like.

Alternatively, instead of a random number or a UE-ID, a determination of whether EDT can be used could also be made on the basis of a random value (that is, a value with which there is a low probability of coincidence between the UEs). For example, as a random value, the size (the transport block size) of the uplink data to be transmitted by the UE 100 using uplink EDT may be used. More specifically, the UE 100 may calculate the "uplink data size mod N" and determine whether EDT can be used according to whether or not the calculation result is a certain numerical value or lies in a certain range of numerical values. Alternatively, the UE 100 may determine that EDT is allowed or regulated on the basis of the fact that the uplink data size is equal to or larger than a certain threshold value, is equal to or smaller than a certain threshold value, or lies (in a range) between the two threshold values. Note that the threshold value may be associated with or contained in the EDT regulation signal.

In step S206, the UE 100 determines whether or not EDT is available to the UE 100 according to the result of step S205. If step S206 yields "YES" (EDT is available), in step S207 the UE 100 starts a random access procedure involving EDT. More specifically, the UE 100 transmits an EDT indication when transmitting Msg 1 in the random access procedure.

If step S206 yields "NO" (EDT is not available), in step S208 the UE 100 starts a random access procedure not involving EDT. More specifically, the UE 100 does not transmit an EDT indication when transmitting Msg 1 in the random access procedure.

Note here that the condition associated with the EDT regulation signal is not limited to being focused on stochastically regulating EDT. That is, the EDT regulation signal may also prohibit the UE 100 that receives the EDT regulation signal from executing EDT. In other words, if EDT by the UE 100 is to be reliably regulated, the eNB 200 may individually transmit or broadcast a signal to that effect, whereby the UE 100 receiving the EDT regulation signal is prohibited from executing EDT.

Summary of Second Embodiment

The operation according to the foregoing second embodiment can be summarized as follows.

A communication control method for controlling EDT in which user data is transmitted and received during a random access procedure comprises: a step A (step S204) in which a UE 100 receives, from an eNB 200, an EDT regulation signal for stochastically regulating EDT; a step B (step S205) in which the UE 100 determines whether or not EDT is available to the UE 100 on the basis of the EDT regulation signal received in step A; a step C (step S207) in which the UE 100 starts a random access procedure involving EDT in response to having determined in step B that EDT is available; and a step D (step S208) in which the UE 100 starts a random access procedure not involving EDT in response to having determined in step B that EDT is not available.

The EDT regulation signal is associated with the condition that makes the EDT available. In step B, the UE 100 determines that the EDT is available in response to the UE 100 satisfying a condition.

Step B includes a step of determining whether or not a random number generated by the UE 100 or an identifier or other information relating to the UE 100 satisfies the condition.

The eNB 200 determines whether or not to transmit the EDT regulation signal on the basis of the load state of the eNB 200.

Third Embodiment

A third embodiment will now be described with a focus on points of difference from the first and second embodiments.

As mentioned earlier, there are two varieties of EDT, namely, the UP solution (that is, user plane EDT) and the CP solution (control plane EDT). The UP solution is applied when the UE 100 is in a suspend state, which is a substate of the RRC idle mode. More specifically, upon receiving an RRC connection release message configuring the suspend state from the eNB 200, the UE 100 transitions to the suspend state, which is a substate of the RRC idle mode. In the suspend state, context information of the UE 100 is maintained in the eNB 200, and a smooth recovery to the RRC connected mode is enabled by utilizing context information held by the eNB 200.

Here, when the UE 100 is configured in a suspend state in order to utilize user plane EDT, a next hop chaining count (NCC) must be provided by the eNB 200 by means of an RRC connection release message. An NCC is encryption information which is used by the PDCP layer in order to perform encryption-related processing (including decoding processing) in the user plane and has a value that is counted on the basis of sequence numbers managed by the PDCP layer. The UEs 100 which are not provided with the NCC are incapable of starting user plane EDT.

However, even for those UEs 100 provided with the NCC, EDT is sometimes not performed due to a situation like that mentioned earlier (in which the transmitted data volume exceeds the maximum data volume, or the like, for example). Regardless of whether the NCC is provided, it is likely that a UE 100 that repeats a random access procedure not involving EDT will execute an application that is not suited to EDT. Hence, providing the NCC to such a UE 100 may be futile.

More specifically, the eNB 200 provides the NCC, which is encryption information used for encryption-related processing in the user plane and information required for user plane EDT, to the UE 100 by means of an RRC connection release message (first NCC provision). After receiving the NCC, the UE 100, which has transitioned to the RRC idle mode (suspend state), transitions to the RRC connected mode as a result of performing a random access procedure not involving EDT with respect to the eNB 200. Next, the eNB 200 provides the NCC to the UE 100 by means of an RRC connection release message (second NCC provision). After receiving the NCC, the UE 100, which has transitioned to the RRC idle mode (suspend state), transitions to the RRC connected mode as a result of performing a random access procedure not involving EDT with respect to the eNB 200. If this operation has been repeated a certain number of times N, the eNB 200 stops providing the NCC to the UE 100. Here, N is a value of 1 or more but is preferably a value of 2 or more. The eNB 200 counts the number of times the UE 100 has not performed EDT irrespective of whether the NCC is provided, and if the count value has reached N, stops providing the NCC to the UE 100. More specifically, the eNB 200 transmits an RRC connection release message not containing the NCC to the UE 100.

The eNB 200 may transmit information indicating the value of N by including this information in SIB, for example. The UE 100 receives the information indicating the value of N from the eNB 200. For example, the UE 100 counts the number of times EDT has not been performed irrespective of whether the NCC has been provided. If a UE100 still has the intention of employing EDT, the UE 100 notifies the eNB 200 of the intention to use EDT before the count value reaches N. Thus, the eNB 200 can be prevented from stopping NCC provision. Reporting of an intention to use EDT could also be executed by means of a conventional Msg 3. More specifically, the MAC PDU constituting the Msg 3 contains an RRC connection resume request and a BSR but the data PDU is not multiplexed.

Modified Example 1 of Third Embodiment

In the foregoing third embodiment, those UEs 100 not provided with the NCC were described as being incapable of utilizing user plane EDT, but it is conceivable that control plane EDT could be available even to such UEs 100. In control plane EDT, user data is contained in the RRC message (early data request message) constituting the Msg 3 but this RRC message is a control plane message and does not require PDCP layer encryption processing, thus obviating the need for the NCC.

Hence, if the NCC is not received from the eNB 200, the UE 100 starts control plane EDT rather than user plane EDT. The UE 100 may also start control plane EDT only if the network is compatible with control plane EDT (if the MME has a data transmission/reception function) and if the application layer of the UE 100 is compatible with control plane EDT (if a connection to the application server is possible via MME).

In such control plane EDT, the UE 100 makes a transmission to the eNB 200 by including user data in the RRC message. Consequently, EDT can be made available even for a UE 100 not provided with the NCC by the eNB 200.

However, if the NCC is received from the eNB 200, the UE 100 starts user plane EDT rather than control plane EDT.

Modified Example 2 of Third Embodiment

As long as provision of the NCC to the UE 100 can be prompted, it is possible to increase the likelihood of the UE 100 being able to use user plane EDT. Furthermore, as long as it is possible to obtain, from the UE 100, information enabling the eNB 200 to determine whether or not to provide the NCC to the UE 100, the eNB 200 is capable of suitably providing the NCC to the UE 100.

Therefore, in this modified example, while in RRC connected mode, the UE 100 transmits, to the eNB 200, a report indicating that the UE 100 has the intention of performing EDT after transitioning to RRC idle mode. This report is issued by means of an RRC message, for example. This report may also be a report indicating an intention to perform user plane EDT.

The eNB 200 uses the report from the UE 100 as information to prompt the provision of the NCC to the UE 100 or as information for determining whether or not to provide the NCC to the UE 100. The eNB 200 provides the NCC to the UE 100 on the basis of this report.

Further Embodiments

Each of the foregoing embodiments may also be carried out separately and independently or may be carried out in combination with two or more of the embodiments.

In the foregoing embodiments, an example in which radio terminals directed toward MTC and IoT (eMTC UEs and NB-IoT UEs) are used was described. However, the present disclosure is not limited to eMTC UEs and NB-IoT UEs. The operations according to the foregoing embodiments may also be applied to general UEs.

In the foregoing embodiments, although the primary focus of the description was on the RRC idle, suspend and connected modes by way of an example, the present disclosure is not limited thereto. The present disclosure may also be applied to RRC write connection and inactive states. RRC write connection is one state of RRC connected mode and is a special state in which a portion of the RRC idle mode procedure is applied. Inactive is an RRC state that is expected to be introduced to fifth-generation mobile communications systems and is a different RRC state from RRC connected mode and RRC idle mode. "RRC idle mode" may also be substituted with "inactive mode" in the foregoing embodiments.

Although UEs that lie within enhanced coverage have been described by way of an example in the foregoing embodiments, the present disclosure is not limited to this example. The operations according to the foregoing embodiments may also be applied to UEs that lie within normal coverage. More specifically, a CE level determination based on RSRP measurement need not be performed in a RACH procedure.

In the foregoing embodiments, an LTE system was illustrated as a mobile communications system. However, the present disclosure is not limited to an LTE system. The operations according to the foregoing embodiments may also be applied to a mobile communications system other than an LTE system (to a fifth-generation mobile communications system, for example).

A program that causes a computer to execute each process executed by the UE 100 and the eNB 200 may also be provided. Furthermore, the program may also be recorded on a computer-readable medium. If a computer-readable medium is employed, the program can be installed on a computer. Here, the computer-readable medium whereon the program is recorded may also be a non-transitory recording medium. A non-transitory recording medium is not particularly limited and may be a recording medium such as a CD-ROM or DVD-ROM, for example. A chip set configured by a memory that stores a program for executing each process implemented by the UE 100 and eNB 200 and a processor that executes the program stored in the memory may also be provided.

APPENDIX

1. Introduction

In this appendix, the remaining issues to complete EDT functionality is discussed.

2. Discussion (2.1. Implicit "BSR=0" in Msg3)
The following items reached agreement.
If EDT has been triggered the UE shall not send BSR in Msg3, i.e. the eNB may assume that there is no data to follow in the UL, which means that BSR is equal to 0 implicitly.

It could be naturally understood that the intention is no data available for transmission after EDT, in terms of (at least) UL transmission. In other words, the UE is prevented from initiating EDT if the UL data size exceeds the broadcasted maximum TBS.

On the other hand, the definition of triggering "BSR=0" (i.e., the condition not to cancel the zero byte BSR, to realize Release Assistance Indication for NB-IoT and BL UE) considers no data to be sent as well as to be received in the near future, as follows.

For NB-IoT or BL UEs:
if rai-Activation is configured, and a buffer size of zero bytes has been triggered for the BSR, and the UE may have more data to send or receive in the near future:
cancel any pending BSR.

The typical use case of EDT is assumed to complete the data transmission/reception in Msg3 and Msg4 without transition to RRC Connected, e.g., a sensor data reporting on UL EDT and its upper layer ACK on DL EDT. But the latest agreement with "which means that BSR is equal to 0 implicitly" might not well describe the case.

Observation 1: It's not crystal clear whether the latest agreement "which means that BSR is equal to 0 implicitly" intends no more data for only UL, or both UL and DL.

If it only intended for the UL buffer status, RAN2 should identify how to capture "no more data" in the specification without using the term "BSR is equal to 0".

If it also intended for the expected DL reception, RAN2 needs to discuss about e.g., no DL case (e.g., UDP type in UL EDT), one DL case (e.g., TCP ACK in DL EDT), how to identify the one DL fits within DL EDT in terms of radio resource (due to DL TBS) and round-trip time (due to T300-EDT), etc.

Proposal 1: RAN2 should clarify how to capture the agreement "which means that BSR is equal to 0 implicitly" in the specification.

(2.2. Fallback Scenarios)
The NW-initiated fallback scenario has been discussed many times and realized by Msg4 with either RRC Connection Setup (for CP EDT) or RRC Connection Resume (for UP EDT). The NW-initiated fallback will be performed e.g., when the DL data cannot be transmitted in Msg4 DL EDT due to larger size than available DL resource and/or data arrival after T300-EDT expiry.

Observation 2 NW-initiated fallback is always allowed due to eNB implementations and/or upper layer problems outside eNB.

The UE-initiated fallback scenario has not been discussed explicitly but somewhat pointed out in the last online discussion, i.e., some companies think a new data arrives after EDT Indication on Msg1 before EDT on Msg3 while some other companies just think it's only associated with support of segmentation.

There is the possibility that the additional UL data is delivered to AS layer after EDT Indication is sent, especially for MTC UE that installs more than one applications, with the agreement "NAS layer does not need to indicate an intention to use EDT when requesting the establishment/resumption of a connection and the decision to use EDT is taken by the AS layer."

Observation 3: UE-initiated fallback scenario may be worth considering due to another UL data arrives between EDT Indication on Msg1 and UL EDT on Msg3.

The UE-initiated fallback is considered that the UE sends Msg3 without data, i.e., legacy Msg3, even after sending EDT Indication on Msg1. However, the problem is the UL resource allocation was already done on Msg2, i.e., larger UL grant size for UL EDT on Msg3. If the UE wants to send legacy Msg3 on the larger UL grant size, the padding issue comes up again for this case. One possible solution could considered that the blind decoding options on Msg3 always allow the legacy Msg3 size, i.e., the minimum TBS for UL EDT is always assumed the same with legacy size. It's preferable the legacy size is considered as an additional option to four blind options with around 320 bits as minimum TBS.

Proposal 2: RAN2 should discuss whether the EDT UL grant should always allow the blind decoding option for legacy Msg3 size, in addition to the agreed 4 options.

(2.3. Assistance Information in RRC Connected)
(2.3.1. NCC Provisioning)

RAN2 agreed that the UE shall not initiate UP EDT if NCC has not been provided by RRC Connection Release.

If a UE is suspended without NCC, UE shall not initiate EDT.

NCC is optionally provided in RRCConnectionRelease message with suspend when the UE is using EDT or the UE is in RRC_CONNECTED.

In case NCC is provided within the EDT procedure, the eNB knows that the UE will likely use EDT next time since it's used this time. For example, the eNB may decide to stop providing NCC if the UE does not use it N times, i.e., initiate RRC Connection Request instead.

However, in case the UE is in Connected (e.g., when the first time to provide NCC), it's still unclear how the eNB determines whether NCC should be provided to this UE since the UE Capability does not tell UE's preference to use EDT.

Observation 4: The eNB may not know whether NCC needs to be provided to the EDT-capable UE in RRC Connected.

The possible solutions could be considered as follows.

Option 1: The eNB always provides NCC when it releases the EDT-capable UEs.

Option 2: The eNB determines whether to provide NCC, per UE, based on UE's preference.

Option 1 is simple and no impact to the specification, while Option 2 is smarter way. Option 2 allows the NW to make sure the probability of EDT initiation in a future, and also allows the UE to inform the eNB of its preference, i.e., similar to the various preference indications. In this sense, it's preferable to introduce the EDT preference indication as additional UE Assistance Information.

Proposal 3: RAN2 should introduce the EDT preference indication in UE Assistance Information, e.g., in order for the eNB to determine whether to provide NCC to the EDT-capable UE in RRC Connected.

(2.3.2. NW Optimization)

The optimal usage of EDT is beneficial from both perspectives of NW and UE, e.g., increased capacity and improved power consumption, but the usefulness of EDT will depend on both NW configuration and MTC application behavior. Thus, the NW may change its configuration in a middle term and/or need optimizations in a long term, in terms of the maximum TBS/blind decoding options for UL EDT and the timers (T300-EDT and Contention Resolution timer-EDT).

Observation 5: NW configuration change/optimization will be necessary to maximize the benefits of EDT.

Some NW implementation will work for this kind of NW optimization, e.g., by monitoring UE behaviors in RRC Connected. However, the data size and the upper layer round-trip time are from requirements of MTC applications implemented in UEs.

Observation 6: The configuration of EDT should be based on the requirements of the MTC applications.

In view of the above observations, it should be considered as part of NW optimization whether the UE should provide feedback regarding its intended application, esp. in regards to the UL data size. Before the UE transitions back to RRC IDLE (e.g., sending RAI), the UE could have the opportunity to inform the eNB of its preferred TBS for EDT, as an assistance information. Such an assistance information may be integrated with the EDT preference indication suggested in Proposal 3 above.

Proposal 4: RAN2 should agree to allow the UE to send the assistance information for TBS/timer configuration optimization, e.g., its preferred TBS and its preferred T300-EDT.

The invention claimed is:

1. A communication control method used in a user equipment for performing a predetermined data transmission in which the user equipment transmits uplink user data in an RRC idle state, the communication control method comprising:
   when the user equipment is in an RRC connected state, transmitting an RRC message to a base station, the RRC message indicating that the user equipment is interested to perform the predetermined data transmission after transitioning to RRC idle mode.

2. The communication control method according to claim 1, further comprising:
   after transmitting the RRC message, receiving from the base station, an RRC connection release message causing the user equipment to transition to the RRC idle state; and
   in response to receiving the RRC connection release message, transitioning to the RRC idle mode, wherein the RRC connection release message includes information indicating a NCC (next Hop Chaining Count) used for the predetermined data transmission.

3. The communication control method according to claim 2, further comprising:

transmitting the uplink user data when the user equipment is in the RRC idle state by using an RRC Connection Resume Request message.

4. A user equipment that performs a predetermined data transmission in which the user equipment transmits uplink user data in an RRC idle state, the user equipment comprising a processor and a memory, wherein the processor is configured to transmit an RRC message to a base station when the user equipment is in an RRC connected state, the RRC message indicating that the user equipment is interested to perform the predetermined data transmission after transitioning to RRC idle mode.

5. An apparatus for controlling a user equipment that performs a predetermined data transmission in which the user equipment transmits uplink user data in an RRC idle state, the apparatus comprising a processor and a memory, wherein the processor is configured to transmit an RRC message to a base station when the user equipment is in an RRC connected state, the RRC message indicating that the user equipment is interested to perform the predetermined data transmission after transitioning to RRC idle mode.

6. A base station that communicates with a user equipment that performs a predetermined data transmission in which the user equipment transmits uplink user data in an RRC idle state, the base station comprising a processor and a memory, wherein the processor is configured to receive an RRC message from the user equipment when the user equipment is in an RRC connected state, the RRC message indicating that the user equipment is interested to perform the predetermined data transmission after transitioning to RRC idle mode.

\* \* \* \* \*